(12) United States Patent
Böhme et al.

(10) Patent No.: US 7,823,559 B2
(45) Date of Patent: Nov. 2, 2010

(54) INTERNAL COMBUSTION ENGINE

(75) Inventors: Daniel Böhme, Kirchheim (DE);
Markus Löffler, Nufringen (DE);
Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 12/322,953

(22) Filed: Feb. 9, 2009

(65) Prior Publication Data
US 2009/0173313 A1 Jul. 9, 2009

Related U.S. Application Data

(63) Continuation-in-part of application No. PCT/EP2007/006929, filed on Aug. 6, 2007.

(30) Foreign Application Priority Data
Aug. 10, 2006 (DE) .................. 10 2006 037 396

(51) Int. Cl.
*F02D 13/04* (2006.01)
(52) U.S. Cl. ................... 123/321; 123/323; 123/568.14
(58) Field of Classification Search ................ 123/320, 123/321, 323, 568.14
See application file for complete search history.

(56) References Cited

U.S. PATENT DOCUMENTS

| 6,152,104 A | * | 11/2000 | Vorih et al. | .................. 123/322 |
| 6,354,254 B1 | | 3/2002 | Usko | |
| 6,983,725 B2 | * | 1/2006 | Persson | .................... 123/90.16 |
| 7,162,996 B2 | * | 1/2007 | Yang | .......................... 123/321 |
| 2003/0221663 A1 | | 12/2003 | Vanderpool et al. | |
| 2004/0231639 A1 | | 11/2004 | Israel et al. | |
| 2005/0145216 A1 | * | 7/2005 | Yang et al. | .................. 123/321 |
| 2006/0060166 A1 | * | 3/2006 | Huang | ........................ 123/321 |
| 2006/0081213 A1 | | 4/2006 | Yang et al. | |
| 2008/0264392 A1 | * | 10/2008 | Sahlen | .................. 123/568.14 |

FOREIGN PATENT DOCUMENTS

| AT | 408129 | 9/2001 |
| WO | WO 98/34014 | 8/1998 |
| WO | WO 00/61930 | 10/2000 |

* cited by examiner

*Primary Examiner*—Erick Solis
(74) *Attorney, Agent, or Firm*—Klaus J. Bach

(57) ABSTRACT

In an internal combustion engine including a camshaft for operating inlet and outlet valves of the engine with lift curves EV, AV of the inlet and the outlet valves determined by the shape of cams of the camshaft, an additional auxiliary cam which acts on the outlet valve is arranged on the camshaft, as a result of which a phase-offset auxiliary lift curve $AV_Z$ is impressed onto the outlet valve.

12 Claims, 2 Drawing Sheets

INTERNAL COMBUSTION ENGINE

This is a Continuation-In-Part Application of pending international patent application PCT/EP2007/006929 filed Aug. 6, 2007 and claiming the priority of German patent application 10 2006 037 396.0 filed Aug. 10, 2006.

BACKGROUND OF THE INVENTION

The invention relates to an internal combustion engine including inlet and outlet valves and a camshaft for operating the inlet and outlet valves.

AT 408 129 B discloses a charged internal combustion engine, including an exhaust gas turbine which is equipped with a variable turbine geometry for adjusting the effective turbine inlet cross section. In order to be able to generate a high braking power during engine braking operation, the variable turbine geometry is adjusted into a restrictive position which reduces the flow cross section, causing a build-up of a high exhaust gas counter-pressure against which the pistons in the cylinders of the internal combustion engine have to perform expulsion work. If braking power is required in a given driving situation, said power is generated according to AT 408 129 B primarily via the engine braking.

During the engine braking operation, an exhaust gas outlet valve is in its open position during the compression stroke, so that the content of the cylinder is expelled into the exhaust train by the movement of the pistons. During this operation however, the opened outlet valves may be subject to substantial oscillations.

It is the principal object of the present invention to provide a low-cost arrangement for an internal combustion engine which is capable of generating high engine braking forces and at the same time ensuring a long engine operating life.

SUMMARY OF THE INVENTION

In an internal combustion engine including a camshaft for operating inlet and outlet valves with lift curves EV, AV of the inlet and outlet valves determined by the shape of cams of the camshaft, an additional auxiliary cam which acts on the outlet valve is arranged on the camshaft, as a result of which a phase-offset auxiliary lift curve $AV_Z$ can be impressed onto the outlet valve.

The auxiliary lift curve, which can be obtained via the auxiliary cam of the outlet valve is phase-offset relative to the basic lift curve and preferably overlaps partly the lift curve of the inlet valve.

In the normal, powered driving mode of operation, the additional lift-off and opening of the outlet valve during the intake stroke permits a certain amount of exhaust gas to return to the cylinder to provide for what is known as internal exhaust gas recirculation in which a partial mass flow of the exhaust gas from the exhaust train is re-circulated into the cylinder via opened exhaust valves. The exhaust gas recirculation is carried out in particular during partial load operation and provides for a reduction of the nitrogen oxides $NO_x$ in the exhaust gas. The internal exhaust gas recirculation allows the exhaust gas mass flow to be re-circulated via external exhaust gas recirculation either to be reduced or if appropriate even to be completely shut down.

During engine braking operation, on the other hand, the additional outlet valve lift, which is in addition to the valve's normal charge exchange lift, is used for the controlled recharging of the cylinders and to increase the engine braking power. Compared to standard camshafts known in the art, the camshaft embodied in accordance with the invention leads to advantages with regard to controlling the adjustment mechanism of the outlet valves at highest engine braking powers. The oscillations of the outlet valves in the engine braking operation, which occur in the prior art, are significantly reduced with the arrangement according to the invention. The outlet valve is guided in a controlled manner in phases of high pressures and high gas flow velocities, thus ruling out uncontrolled lifting-off of the outlet valve and accompanying high loads acting on the outlet valve. The additional, controlled lifting of the outlet valve can be carried out using simple design measures, as merely an auxiliary cam has to be arranged on the camshaft to realize the auxiliary lift curve.

According to an advantageous embodiment, the closing moment of the auxiliary lift curve of the outlet valve comes after the closing moment of the lift curve of the inlet valve in time. If the inlet valve and outlet valve are opened simultaneously, a continuous flow connection is provided between the exhaust train and intake tract via the cylinders. Inner exhaust gas recirculation can be carried out in this phase. In the short phase between the closing of the inlet valve and the closing moment of the outlet valve during the auxiliary lift of the outlet valve, the piston in the cylinder is located in the region of the bottom dead center at the transition from the inlet stroke to the compression stroke, as a result of which the cylinder can be partly filled with exhaust gas from the exhaust train and the degree of filling is overall improved.

The opening duration of the auxiliary lift curve of the outlet valve is advantageously shorter than the opening duration of the inlet valve; although it is expediently at least 30%, it is conventionally not more or not much more than 50%. In addition, the lift of the auxiliary lift curve is expediently much shorter than the lift of the inlet valve; although it is advantageously at least 10% of the lift of the inlet valve, it is conventionally not more than 20%. The shortened duration and the shorter lift of the outlet valve during the auxiliary lift curve leads to no or only minor limitations being expected in the regular, fired operation of the internal combustion engine compared to an outlet valve which is completely closed in this phase.

In a further advantageous embodiment, it is possible to provide an additional charge exchange valve which is embodied as a throttle valve which, like the outlet valve, releases in the opened state an outlet into the exhaust train, but can be actuated independently of the outlet valve. This throttle valve advantageously has assigned to it its own actuator which is to be actuated separately, wherein the throttle valve is advantageously in a constant opening position during the engine braking operation and is closed in the fired operation.

According to a further, preferred embodiment, the internal combustion engine is provided with an exhaust turbocharger, the exhaust gas turbine of which is equipped with variable turbine geometry for alterably adjusting the effective turbine inlet flow cross section. For generating high engine braking powers, the variable turbine geometry is transmitted to a restrictive position reducing the inlet flow cross section. This causes between the cylinder outlet and the exhaust gas turbine high exhaust gas counter-pressures which counteract the expulsion of the cylinder content.

The invention will become more readily apparent from the following description of particular embodiments thereof on the basis of the accompanying drawings:

DESCRIPTION OF PARTICULAR EMBODIMENTS

Figure 1:
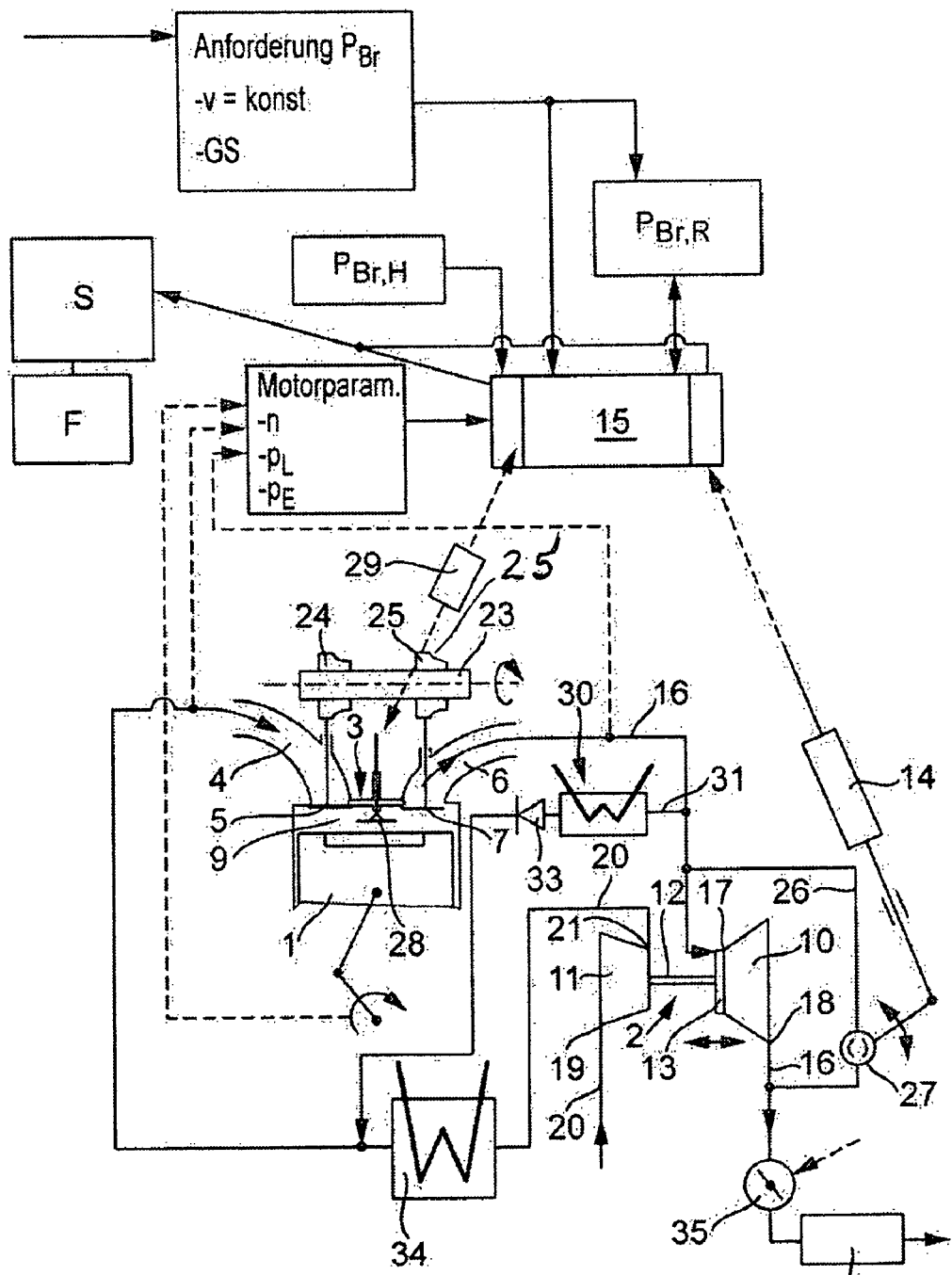
FIG. 1 is a schematic view of an internal combustion engine having an exhaust turbocharger, one of the cylinders of the internal combustion engine being shown in an enlarged view including associated inlet and outlet valves and a camshaft influencing the lift curve of the valves.

FIG. 1 shows an internal combustion engine which is for example a diesel engine or a spark ignition engine. The enlarged view indicates a cylinder 1 of the internal combustion engine, the combustion chamber 9 of which is flow-connected to the inlet channel 4 via an inlet valve 5 and to the exhaust manifold 6 via an outlet valve 7. The inlet channel 4 is part of the intake tract 20 of the internal combustion engine, whereas the exhaust manifold 6 is connected to the exhaust line 16 of the internal combustion engine. When the inlet valve 5 is opened, combustion air flows via the inlet channel 4 into the combustion chamber of the cylinder 1; when the outlet valve 7 is opened, the gas located in the combustion chamber is discharged from the combustion chamber into the exhaust train or the exhaust line 16 via the exhaust manifold 6.

The charge exchange valves 5 and 7 are controlled by a camshaft 23 on which cams 24 and 25 are arranged, of which the cam 24 is associated with the inlet valve 5 and the cam 25 is associated with the outlet valve 7. The contour of the cams 24 and 25 is transmitted to the charge exchange valves 5 and 7 with the aid of suitable transmission members. The lift curve of the valves 5 and 7 is determined by the cam contour. During rotation of the camshaft, the contour of each cam is scanned and transmitted onto each valve 5, 7 for generating the lift curve.

Furthermore, each cylinder 1 is provided with a throttle valve 28 that is an outlet valve which opens into the exhaust line 16. The throttle valve 28 can be actuated via an actuator 29 independently of the camshaft 23.

All of the charge exchange valves 5, 7 and 28 are located in the cylinder head 3 of the internal combustion engine.

Figure 2:
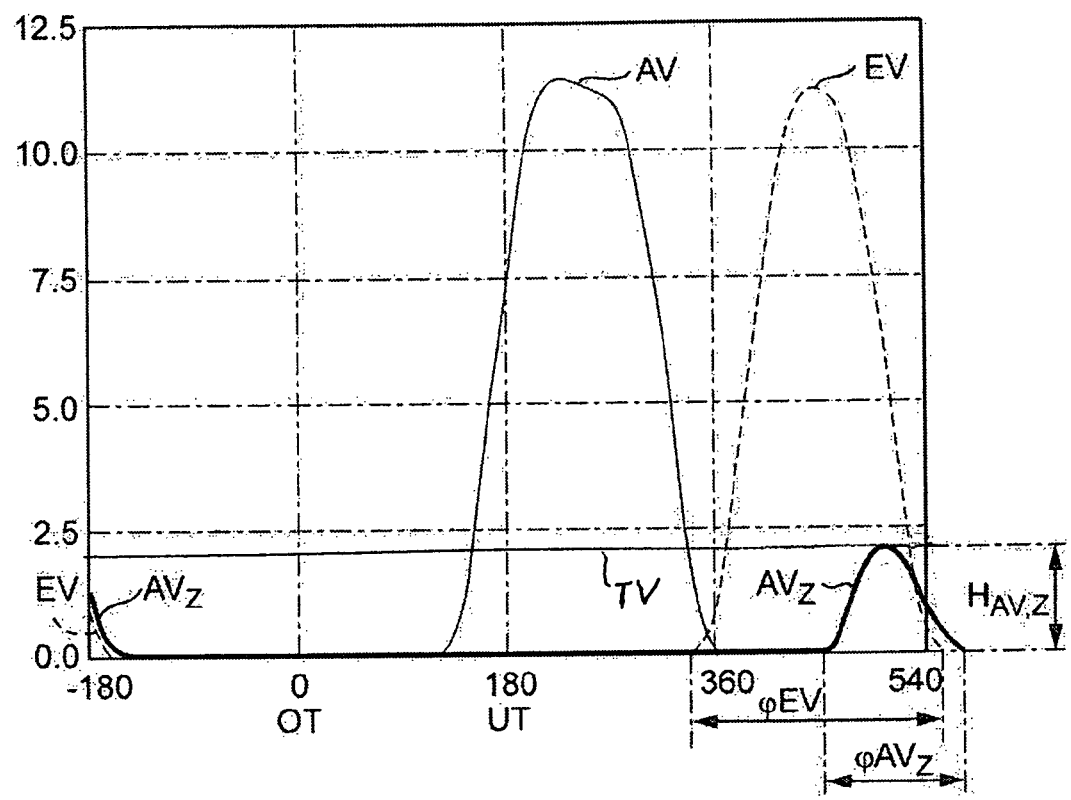
FIG. 2 is a diagram showing the lift curves for the inlet and outlet valves including an illustration of an additional lift curve for the outlet valve.

In addition to the cam 25, a further cam is also associated with the outlet valve 7, or the cam 25 also has an additional cam structure 25' via which an additional lift curve can be impressed onto the outlet valve 7. This auxiliary lift curve is illustrated in FIG. 2 and will be described with reference to FIG. 2.

As may also be seen from FIG. 1, the internal combustion engine is equipped with an exhaust turbocharger 2 comprising an exhaust gas turbine 10 in the exhaust line 16 and a compressor 11 in the intake tract 20. The turbine wheel of the exhaust gas turbine 10 is rotationally coupled to the compressor wheel of the compressor 11 via a shaft 12. In the operation of the internal combustion engine, combustion air, which is compressed by the compressor wheel to an elevated pressure, is supplied to the compressor 11 from the environment via the compressor entry 19. In the compressed state, the air is discharged from the compressor via the compressor outlet 21 and is fed into the inlet channel 4 via the intake tract 20 and a charge air cooler where the air is cooled before reaching the inlet channel 4.

On the exhaust gas side, the gas discharged from the combustion chamber 9 flows via the exhaust line 16 and the turbine inlet 17 to the turbine for driving the turbine wheel. The expanded gas is discharged from the turbine via the turbine outlet 18.

Expediently, the exhaust gas turbine 10 is provided with variable turbine geometry 13 which can be used to adjust the effective turbine entry cross section relative to the turbine wheel between a minimum stowage position and a maximum opening position. The variable turbine geometry is embodied for example as a braking baffle which can be inserted axially into the turbine entry channel. Also possible, however, is an embodiment as a guide baffle which is arranged in the turbine entry cross section and has adjustable guide blades.

The exhaust gas turbine 10 is bridged by a bypass 26 in which an adjustable bypass valve 27 is arranged. The bypass 26 branches from the exhaust line 16 downstream of the exhaust gas turbine 10 and opens back into the exhaust line downstream of the exhaust gas turbine. An actuator 14 is provided for adjusting the bypass valve 27.

In addition, the internal combustion engine is provided with an exhaust gas recirculation means 30 comprising a recirculation line 31 with an exhaust gas cooler 32 arranged therein and an adjustable, unidirectional shut-off valve 33. The recirculation line 31 branches off from the exhaust line 16 upstream of the exhaust gas turbine 10 and opens into the intake tract 20 downstream of a charge air cooler 34. The exhaust gas recirculation means 30 is what is known as external exhaust gas recirculation in which the recirculation of the gas from the exhaust train into the intake tract is carried out via a line outside the cylinder. If, on the other hand, exhaust gas is transferred directly from the exhaust line 16 into the intake tract 20 via the combustion chamber 9 of the cylinder, when the inlet and outlet valves are open, the term "internal exhaust gas recirculation" is used.

Downstream of the exhaust gas turbine 10, an adjustable brake flap 35 is arranged in the exhaust line 16. The brake flap 35 is located immediately upstream of an exhaust gas cleaning means 36.

The actuating members and actuators in the internal combustion engine or in the secondary units of the internal combustion engine are adjusted via actuating signals from an open- and closed-loop control unit 15 as a function of various state and operating variables. These state and operating variables comprise, for example as engine parameters, the engine speed n, the charge pressure $P_L$ in the inlet channel 4 and the turbine inlet pressure $P_E$ at the turbine inlet 17. Further parameters and influencing variables include the braking power requirement $P_{Br}$ which is defined by the driver and supplied to the mechanical wheel brake $P_{Br,R}$ and also if appropriate to the hand brake $P_{Br,H}$. In addition, account is also taken, as variables characterizing the driving state, of the driving speed v and if appropriate of a danger signal GS which denotes a dangerous situation. In addition, a safety check of the charge exchange valves can be carried out in a block S, wherein an error signal F is displayed in the event of an error. All of the aforementioned influencing variables or state and operating variables are supplied to the open- and closed-loop control unit and processed there. Actuating signals for adjusting for example the variable turbine geometry 13, the actuator 29 for the throttle valve 28, the actuator 14 for the bypass valve 27 and the shut-off valve 33 in the exhaust gas recirculation means 30, are generated as a function of these variables.

FIG. 2 shows a diagram with the lift curves AV and EV for the outlet valve and the inlet valve as a function of the crank angle, illustrated in degrees. In the expulsion phase, approximately between a crank angle of 180° (bottom dead center BDC) and a crank angle of 360°, the outlet valve with the lift curve AV is opened; this angular range characterizes the expulsion phase. At a crank angle of approximately between 360° (top dead center TDC) and 540°, the inlet valve with the lift curve EV is in the opening position; this phase is referred to as the inlet phase. The opening duration of the lift curve EV of the inlet valve is characterized by $\phi_{EV}$.

Roughly in the second half of the lift curve EV of the inlet valve, the outlet valve is additionally also opened in accordance with the plotted lift curve $AV_Z$. The opening duration of this additional lift curve $AV_Z$ of the outlet valve is characterized by $\phi_{AV,Z}$; it is at least 30% of the opening duration $\phi_{EV}$ of the lift curve EV of the inlet valve, but expediently not more than 50%. The lift curve height of the auxiliary lift curve $AV_Z$ is also much lower than the level of the lift curves AV and EV; the lift $H_{AV,Z}$ of the auxiliary lift curve $AV_Z$ is expediently at least 10% of the lift $H_{EV}$ of the inlet valve, but advantageously not more than 20% or 30%. The outlet open moment—i.e. the start of the lift curve $AV_Z$—coincides roughly with the peak of the lift curve EV of the inlet valve.

As indicated by the valve lift curve TV, during engine braking operation, the throttle valve 28, which is controlled independently of the gas inlet and outlet valves 5 and 7, is continuously open.

What is claimed is:

1. An internal combustion engine having at least one cylinder (1) with inlet and outlet valves (5, 7), a camshaft (23) with cams (24, 25) which act on the inlet and outlet valves (5, 7) for opening or closing inlet and outlet passages (4, 6) of the cylinder (1), wherein lift curves (EV, AV) of the inlet and outlet valves (5, 7) are determined by the shape of the cams (24, 25) of the camshaft (23), and wherein the lift curve (EV) of the inlet valve (5) is phase-offset relative to the lift curve (AV) of the outlet valve (7), the camshaft (23) including an auxiliary cam (25') for acting on the outlet valve (7) and providing for the outlet valve (7) a phase-offset auxiliary lift curve ($AV_Z$), which overlaps at least partly the lift curve (EV) of the inlet valve (5), the at least one cylinder (1) including further an adjustable throttle valve (28) provided as an additional outlet valve in an engine braking phase, wherein the adjustable throttle valve (28) is held in a constantly open position (TV).

2. The internal combustion engine as claimed in claim 1, wherein the closing point of the auxiliary lift curve ($AV_Z$) of the outlet valve (7) is set to be after the closing point of the lift curve (EV) of the inlet valve (5).

3. The internal combustion engine as claimed in claim 1, wherein the opening duration ($\phi_{AV,Z}$) of the auxiliary lift curve ($AV_Z$) for the outlet valve (7) is shorter than the opening duration ($\phi_{EV}$) of the lift curve (EV) of the inlet valve (5).

4. The internal combustion engine as claimed in claim 1, wherein the opening duration ($\phi_{AV,Z}$) of the auxiliary lift curve ($AV_Z$) of the outlet valve (7) is at least 30% of the opening duration ($\phi_{EV}$) of the lift curve (EV) of the inlet valve (5):

$$\frac{\varphi_{AV,Z}}{\varphi_{EV}} > 30\%.$$

5. The internal combustion engine as claimed in claim 1, wherein the lift curve (EV) of the inlet valve (5) assumes its peak at the start of the opening of the auxiliary lift curve ($AV_Z$).

6. The internal combustion engine as claimed in claim 1, wherein the lift ($H_{AV,Z}$) of the auxiliary lift curve ($AV_Z$) is smaller than the lift ($H_{EV}$) of the inlet valve (5).

7. The internal combustion engine as claimed in claim 1, wherein the lift ($H_{AV,Z}$) of the auxiliary lift curve ($AV_Z$) is at least 10% of the lift ($H_{EV}$) of the inlet valve (5):

$$\frac{H_{AV,Z}}{H_{EV}} > 10\%.$$

8. The internal combustion engine as claimed in claim 1, wherein a separately actuable actuator (29) is provided for controlling the throttle valve (28).

9. The internal combustion engine as claimed in claim 1, wherein an exhaust gas recirculation means (30) having a recirculation line (31) is provided between the exhaust train and the intake tract (20) and an adjustable shut-off valve (33) is provided in the recirculation line (31).

10. The internal combustion engine as claimed in claim 1, including an exhaust tract (16) and an intake tract (20) with a turbocharger (12) having an exhaust gas turbine (10) disposed in the exhaust tract (16) and a compressor (11) in the intake tract (20).

11. The internal combustion engine as claimed in claim 10, wherein the exhaust gas turbine (10) is equipped with a variable turbine geometry (13) for adjusting the effective turbine inlet flow cross section.

12. The internal combustion engine as claimed in claim 1, wherein an adjustable brake flap (35) is arranged in the exhaust tract.

\* \* \* \* \*